United States Patent
Aoki et al.

(10) Patent No.: US 6,774,319 B2
(45) Date of Patent: Aug. 10, 2004

(54) SEAT-LOAD MEASURING DEVICE

(75) Inventors: Hiroshi Aoki, Shiga (JP); Hirokazu Hida, Shiga (JP)

(73) Assignee: Takata Corporation, Tokyo (JP)

( * ) Notice: Subject to any disclaimer, the term of this patent is extended or adjusted under 35 U.S.C. 154(b) by 204 days.

(21) Appl. No.: 10/105,801

(22) Filed: Mar. 26, 2002

(65) Prior Publication Data

US 2002/0185318 A1 Dec. 12, 2002

(30) Foreign Application Priority Data

Mar. 26, 2001 (JP) .......................................... 2001-087777
Feb. 26, 2002 (JP) .......................................... 2002-049267

(51) Int. Cl.[7] .......................... G01G 19/34; G01G 23/01; B60K 28/04
(52) U.S. Cl. .................... 177/144; 177/185; 177/210 R; 701/45; 340/667; 180/273; 280/735; 702/101
(58) Field of Search ................................. 177/136, 144, 177/185, 210 R; 340/667; 180/273; 280/735; 701/45; 702/101, 102

(56) References Cited

U.S. PATENT DOCUMENTS

| | | | | |
|---|---|---|---|---|
| 4,379,495 A | * | 4/1983 | Cocks et al. ..................... | 177/1 |
| 4,751,973 A | * | 6/1988 | Freeman et al. ......... | 177/25.13 |
| 4,860,839 A | * | 8/1989 | Reichmuth ................... | 177/185 |
| 4,951,763 A | * | 8/1990 | Zimmerman et al. ........ | 177/164 |
| 5,062,492 A | * | 11/1991 | Inoue ....................... | 177/25.14 |
| 5,172,783 A | * | 12/1992 | Feinland et al. ............ | 177/185 |
| 5,178,228 A | * | 1/1993 | Feinland et al. ............ | 177/185 |
| 5,220,970 A | * | 6/1993 | Bachmann ................... | 177/178 |
| 5,942,695 A | * | 8/1999 | Verma et al. ................. | 73/768 |
| 6,056,079 A | * | 5/2000 | Cech et al. ................. | 180/273 |
| 6,177,637 B1 | * | 1/2001 | Evans ...................... | 177/25.13 |
| 6,188,940 B1 | * | 2/2001 | Blackburn et al. ............ | 701/45 |

OTHER PUBLICATIONS

U.S. patent application Publication U.S. 2000/0004629 A1, Cooper et al., published on Jan. 2, 2003 (filed on Jul. 2, 2001).*

* cited by examiner

Primary Examiner—Randy W. Gibson
(74) Attorney, Agent, or Firm—Kanesaka & Takeuchi

(57) ABSTRACT

A seat-load measuring device for measuring a weight of a passenger and an object sitting on a car seat includes a load sensor disposed under the seat for electrically sending load data, a first data processing unit having a predetermined response time, a second data processing unit having a slower response time than that of the first data processing unit, a detecting device for detecting a change in the load data, and a switching device electrically connected to the detecting device. The first and the second data processing unit switch between the first and the second data processing unit to process the load data from the load sensor.

10 Claims, 5 Drawing Sheets

SEAT-LOAD MEASURING DEVICE

BACKGROUND OF THE INVENTION AND RELATED ART STATEMENT

The present invention relates to a seat-load measuring device for measuring a weight of a passenger and an object sitting on a car seat.

In a passenger car, control operations of winding a seatbelt and inflating an airbag are performed based on whether or not a car is occupied, whether an adult or a child is sitting on the seat, whether or not a child-seat is mounted, and the like. To achieve this purpose, a seat-load measuring device has been increasingly used for measuring the weight of the passenger and the object sitting on the car seat.

Such a seat-load measuring device has a configuration such that a load measuring section provided under the seat measures the overall weight of the seat, the passenger, and the object on the seat, and then a true load on the seat is obtained by subtracting the weight of the seat from the above overall weight. A strain gauge is typically used as a sensor of the load measuring section.

A measured value varies with noise caused by a motion of the passenger on board or acceleration of the car. Thus, the seat-load measuring device is required to remove such noise so as to maintain measurement accuracy within a predetermined range. In addition, a large load change takes place in a short period of time when the passenger is in a half-sitting posture on the seat upon opening and closing a door, or trying to pick something up. Even when such a large load change takes place, the seat-load measuring device is required to maintain the measurement variance within an acceptable range.

To achieve this, merely providing the measuring device with a low-pass filter is sufficient to remove small load changes. However, the low-pass filter with a large time constant, which can ignore a large temporary load change, has a risk of failing to detect a true load change during moving.

Also, it is necessary to measure the load as quick and accurate as possible to start the seatbelt control when the passenger sits on the seat. However, the above slow response load measuring device does not meet this requirement.

In view of these problems, the object of the present invention is to provide the seat-load measuring device that can perform a quick load measurement when the passenger sits on the seat, and become relatively insensitive to a load change after the passenger sits on the seat.

Further objects and advantages of the invention will be apparent form the following description of the invention.

SUMMARY OF THE INVENTION

The first aspect of the invention for solving the above problems provides a seat-load measuring device for measuring a weight of a passenger and an object sitting on a car seat. The measuring device has a function in which, when a load exerted on the seat exceeds a predetermined value, for example, when the passenger gets in or out of a car, an output from the load sensor through a slow response system is taken first as a measured load, and then the load sensor output through a fast response system is taken as the measured load.

According to the first aspect, the measuring device first determines whether or not a change in the load exerted on the seat goes beyond a predetermined value. When the seat is unoccupied or the passenger remains sitting on the seat in a normal manner, the load change is small even if the load varies. A large load change takes place when the passenger gets in or out of the car, or leaves the seat, for example, when trying to pick something up, or pushes the seat to get in the car. The first aspect is provided for determining if the latter case occurs.

In the latter case, the measuring device determines if the load change is temporary, and keeps the measured load unchanged if it is the case. At a point when the measuring device confirms that the load change is not temporary, the measuring device quickly starts to take an output from the load sensor through the fast response system.

To achieve this, even when the change in the load exerted on the seat exceeds the predetermined value, the measured load does not immediately reflect the change in the load, but takes an output from the load sensor through the slow response system as the measured value for the time being. Here, the slow response system means a filter with a slow response time or a system that holds a measured load, and also has a function of a low-pass filter.

Accordingly, for a certain period of time (which can be fixed or variable), the output from the load sensor is not taken as the measured load, or the output through the slow response is used as the measured load. Thus, if the passenger gets out of the seat when trying to pick something up or pushes the seat with a hand, for example, when getting in the car, the load associated with these instances is not used as the measured seat load.

If the measured value still continues to exceed the predetermined value after the above certain period of time, the output from the load sensor is taken through the fast response system and is set as an updated measured load, assuming that the passenger actually gets in or out of the car. Here, the fast response system means a filter with a fast response time, and also has a function of a low-pass filter.

According to this aspect, the output from the load sensor is processed through the slow response system when the load change is temporary, and through the fast response system after the load change continues for a fixed or variable predetermined time. Therefore, the measured load quickly comes close to the output from the load sensor when the passenger gets in or out of the car, while avoiding a situation in which the load change unrelated to getting in or out of the car is taken as the measured load.

The second aspect of the invention for solving the above problems provides a device in the first aspect further having a plurality of filters with different time constants. The device is capable of switching a state in which the output from the load sensor through the slow response system is taken as the measured load to another state in which the output from the load sensor through the fast response system is taken as the measured load. The switching timing is determined on the basis of a difference between outputs through at least two filters, one with a small time constant and the other with a large time constant.

The filter with the small time constant as mentioned above includes the one with a zero time constant, that is, the one that does not function as a filter. The difference between two outputs of the load sensor, one processed through the filter with the small time constant and the other processed through the filter with the large time constant, changes from "small" to "large" to "small" when the passenger gets in or out of the car. That is, a state of the large difference continues for a certain period of time. On the other hand, the state of the large difference continues only for a short period of time when the passenger is in a half-sitting posture to try to pick something up, or pushes the seat with a hand upon getting in the car.

By utilizing this feature, the measuring device determines whether the difference is caused by the passenger getting in or out of the car, or by a temporary load change. Only when the former is the case, the measuring device switches the state in which the output from the load sensor through the slow response system is taken as the measured load to the other state in which the output from the load sensor through the fast response system is taken as the measured load. Thus, the measuring device allows the measured load to quickly come close to the output from the load sensor when the passenger gets in or out of the car, while avoiding a situation in which the load change unrelated to getting in or out of the car is taken as the measured load.

In this means, two outputs of the load sensor, one through the filter with the small time constant and the other through the fast response system, may be the same, but are not necessarily the same. Likewise, two outputs of the load sensor, one through the filter with the large time constant and the other through the slow response system, may be the same, but are not necessarily the same. That is to say, "at least two filters, one with the small time constant and the other with the large time constant" in this aspect are used for determining the timing based on the difference, and the outputs through these filters are not necessarily used as the measured load. An output from the load sensor through the slow response filter or the fast response filter, which are different from these filters, may be used as the measured load.

Furthermore, the fast response system and the slow response system may be configured with different filters so as to be used by switching them, or may be configured with a single filter by switching circuit constants of the single filter (or coefficients in the case of a digital filter) so as to create the fast response system and the slow response system, and be used by switching them.

The third aspect of the invention for solving the above problems provides a device in the second aspect further comprising the slow response system that has a digital filter for delaying a response. The device has a function that, when a state in which the output from the load sensor through the slow response system is taken as the measured load is switched to another state in which the output through the fast response system is taken as the measured load, a value of the digital filter is changed so that the output through the slow response system comes close to that through the fast response system.

In the second aspect, there is a case in which the output from the load sensor through the slow response system is taken as the updated measured load to avoid the disturbance caused by noise and the like after the measurement is switched to a stable state from a state in which the output from the load sensor through the fast response system is taken as the measured load. At this moment, however, as the filter with the large time constant, which is used as the slow response system, does not respond quickly, the output through the filter is sometimes deviated from that of the load sensor.

In the third aspect, therefore, the value of the filter in the slow response system is changed so that the output load of the slow response system comes close to that of the fast response system when the state in which the output from the load sensor through the slow response system is taken as the measured load is switched to the other state in which the output from the load sensor through the fast response system is taken as the measured load. Since this filter is the digital filter, the above two output loads may be forced to agree with each other by replacing all load values stored in the filter (i.e., values stored in the corresponding shift registers) in the slow response system with those stored in the filter in the fast response system. Alternately, the output load of the slow response system may be changed closer to that of the fast response system by changing response coefficients of the filter in the slow response system so as to make the response time faster. Thus, even if the output of the filter with the large time constant is used as the measured load hereinafter, the output is not significantly deviated from the actual value.

The phrase "when the state in which the output from the load sensor through the slow response system is taken as the measured load is switched to the other state in which the output from the load sensor through the fast response system is taken as the measured load" means a switching instance, and more particularly, means an instance of the exchange, and the instance can be when at least the measured load is switched to the output from the load sensor through the fast response system or when the predetermined time period elapses after the switch occurs.

The fourth aspect of the invention for solving the above problems provides a seat-load measuring device for measuring the weight of the passenger and the object sitting on the car seat. In the measuring device, when the measured load exceeds a predetermined value, the output from the load sensor through the system, which has the slower response than the system for the case in which the measured load is smaller than the predetermined value, is taken as the measured load.

In the fourth aspect, if the measured load exceeds the predetermined value, that is, the passenger is assumed to be on board, the load change associated with the moving car or changes in the passenger's motion is likely to become a noise. To remove such a noise, the output from the load sensor through the slow response system is used as the measured load.

On the other hand, if the measured load is equal to or smaller than the predetermined value, that is, the passenger is assumed not to be on board, the load change is small and the noise is also insignificant. Thus, the output from the load sensor through the fast response system is used as the measured load, thus allowing the passenger to be detected quickly upon getting in the car.

An operation of "the output of the load sensor through the slower response system is used as the measured load" can be done by switching response systems with different response times to each other, or by changing the response time in the single response system. This aspect can be used in combination of the foregoing first to third aspects, or the fifth to seventh aspects described later.

The fifth aspect of the invention for solving the above problems provides a seat-load measuring device for measuring the weight of the passenger and the object sitting on the car seat. In the measuring device, when the load exerted on the seat exceeds a predetermined value, for example, when the passenger gets in or out of the car, a previously measured value obtained before the load change is taken and held as the measured load for a predetermined period of time, then after that, the measured value is updated by a freshly measured value. The predetermined period of time is adjusted according to the change in the load exerted on the seat.

In the fifth aspect, which is a modification of the first aspect, the previously measured value obtained before the load change is held as the measured load for the predetermined period of time, and the value measured after the period of time is used as the updated measured load. The term "the measured value" means either of the output from the load sensor or the output from the load sensor through the filter.

"The predetermined time period" can be adjusted in accordance with the change in the load exerted on the seat. That is, a previously measured value obtained before the load change is held as the measured load while the load change is unstable, and the newly measured value is used as the updated measured load when the load change is stabilized, or when the predetermined time period elapses after the load change is stabilized.

According to the fifth aspect, when the passenger gets out of the seat when trying to pick something up, or pushes the seat with a hand, for example, when getting in the car, the previously measured value is held as the measured load since the load change is unstable, and the newly measured value (which is substantially the same as the previously measured value) is used as the measured load when the unstable load change does not exist any more. On the other hand, since the load change is stable when the passenger gets in or out of the car, the newly measured value is used as the updated measured load after the predetermined time period.

The sixth aspect of the invention for solving the above problems provides a measuring device in accordance with the fifth aspect, further comprising a plurality of filters with different time constants. The predetermined period of time is determined on the basis of a difference between outputs of at least two filters, one with the small time constant and the other with the large time constant.

The difference between two outputs of the load sensors, one through the filter with the small time constant and the other through the filter with the large time constant, changes from "small" to "large" to "small" when the passenger gets in or out of the car. That is, a state of the large difference continues for a certain period of time. On the other hand, the state of the large difference continues only for a short period of time when the passenger is in a half-sitting posture to try to pick something up, or pushes the seat with a hand upon getting in the car. By utilizing this feature, the measuring device determines whether the difference is caused by the passenger getting in or out of the car, or by the temporary load change, which adjusting the predetermined period of time is based on.

The seventh aspect of the invention for solving the above problems provides a measuring device in accordance with the sixth means, further including digital filters as the above filters. The device has a function in that the output through the filter with the large time constant is used as the measured load after the predetermined period of time.

The seventh aspect has the same effects as does the third aspect.

DETAILED DESCRIPTION OF PREFERRED EMBODIMENTS

Figure 1:
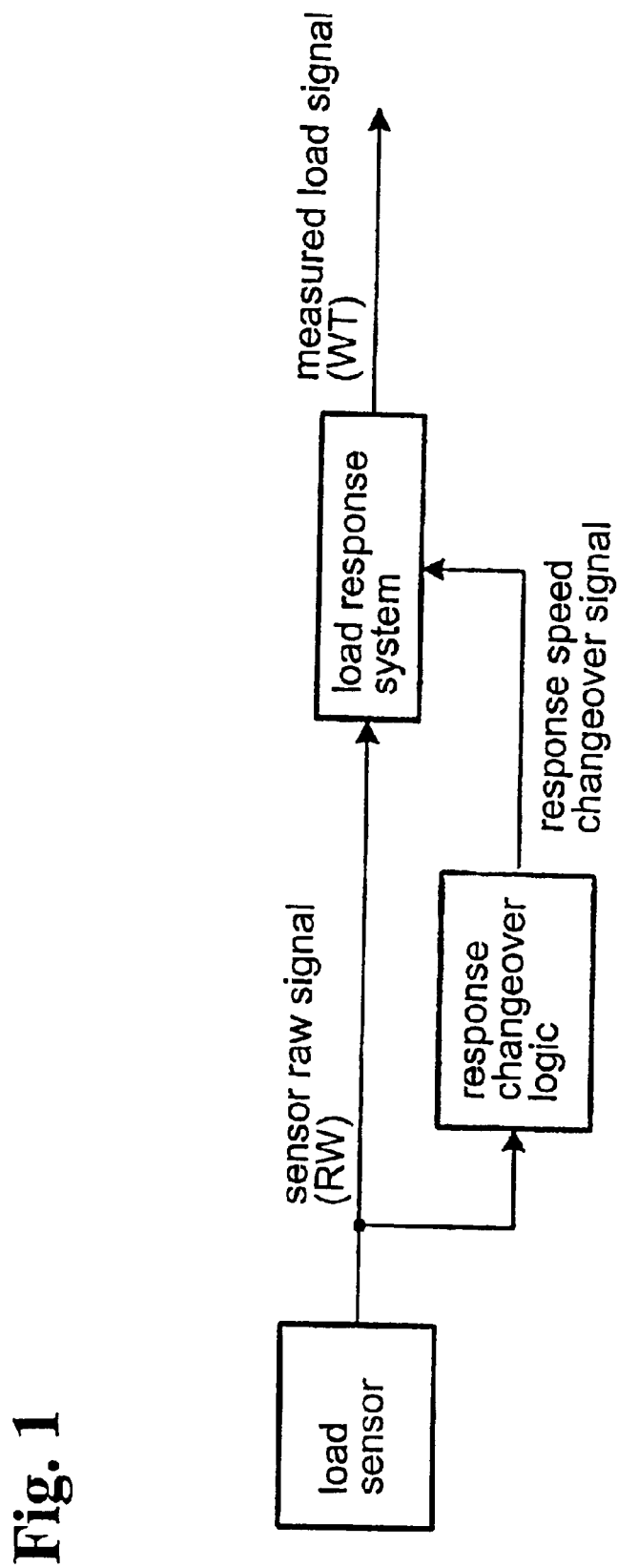
FIG. 1 is a block diagram showing a process of measuring load in an example of a seat-load measuring device according to an embodiment of the present invention.

Hereunder, embodiments of the invention will be explained with reference to the accompanied drawings. FIG. 1 is a block diagram showing a process of measuring load in an example of a seat-load measuring device according to an embodiment of the present invention. A sensor raw signal (RW) measured by a load sensor is raw data of a measured value of a load mounted on a seat, and usually represents a weight of a passenger sitting on the seat. The sensor raw signal RW is input into a load response system and output as a measured load (WT) through a filter. In the load response system, by changing filter response speeds according to a response speed changeover signal or by inputting the sensor raw signal RW into filters with different response speeds and by selecting one of the filters to be used, the sensor raw signal RW processed at the different response speeds is output as the measured load WT. In some cases, an output through the filter is held and a constant value is output as WT.

A response changeover logic receives the raw signal RW from the load sensor, and produces a response speed changeover signal with predetermined logic according to a magnitude of a load change and a period of time that the change continues.

Figure 2A:
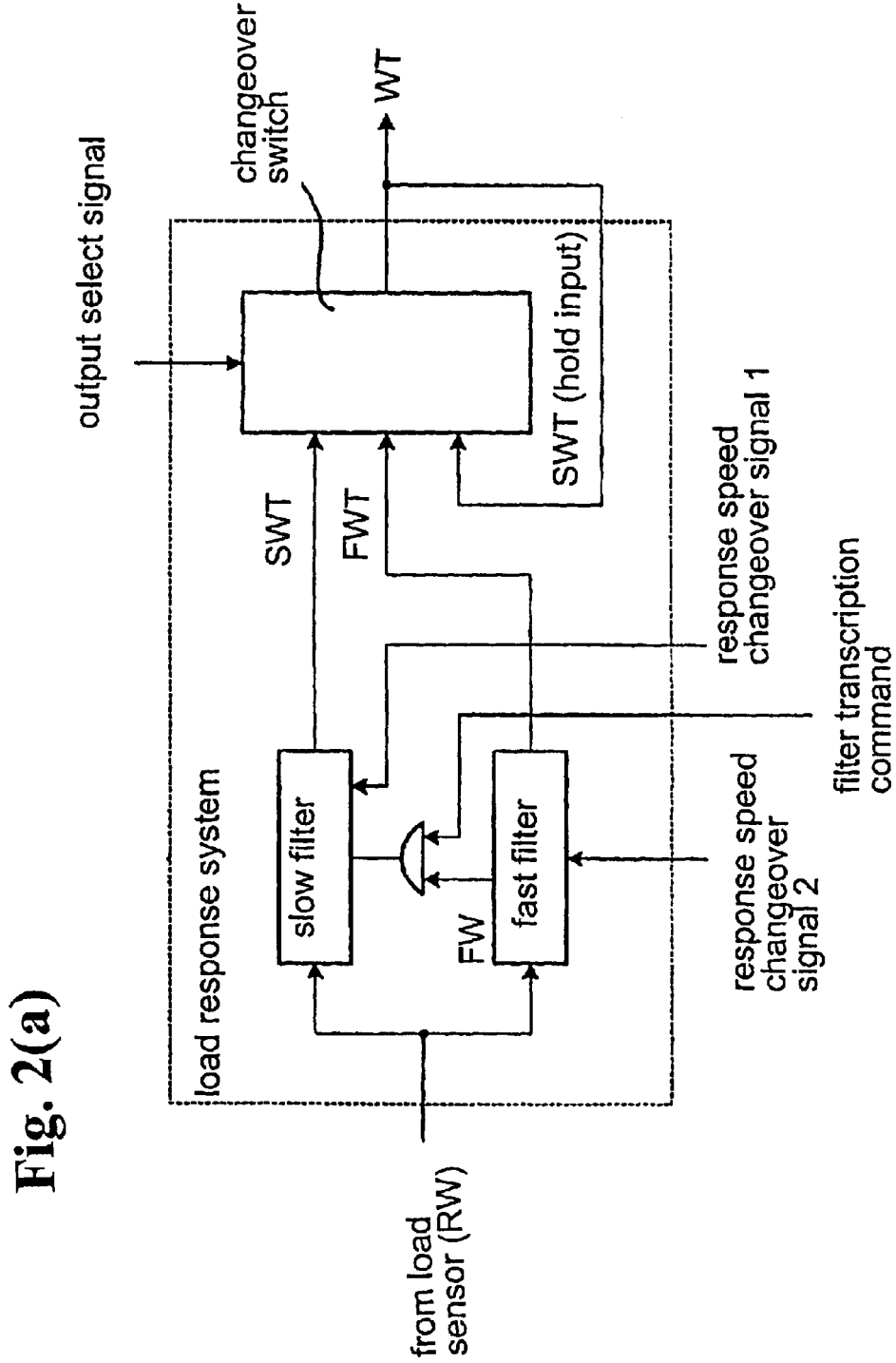
FIGS. 2(a) and (b) are block diagrams showing a detailed load response system.
Figure 2B:
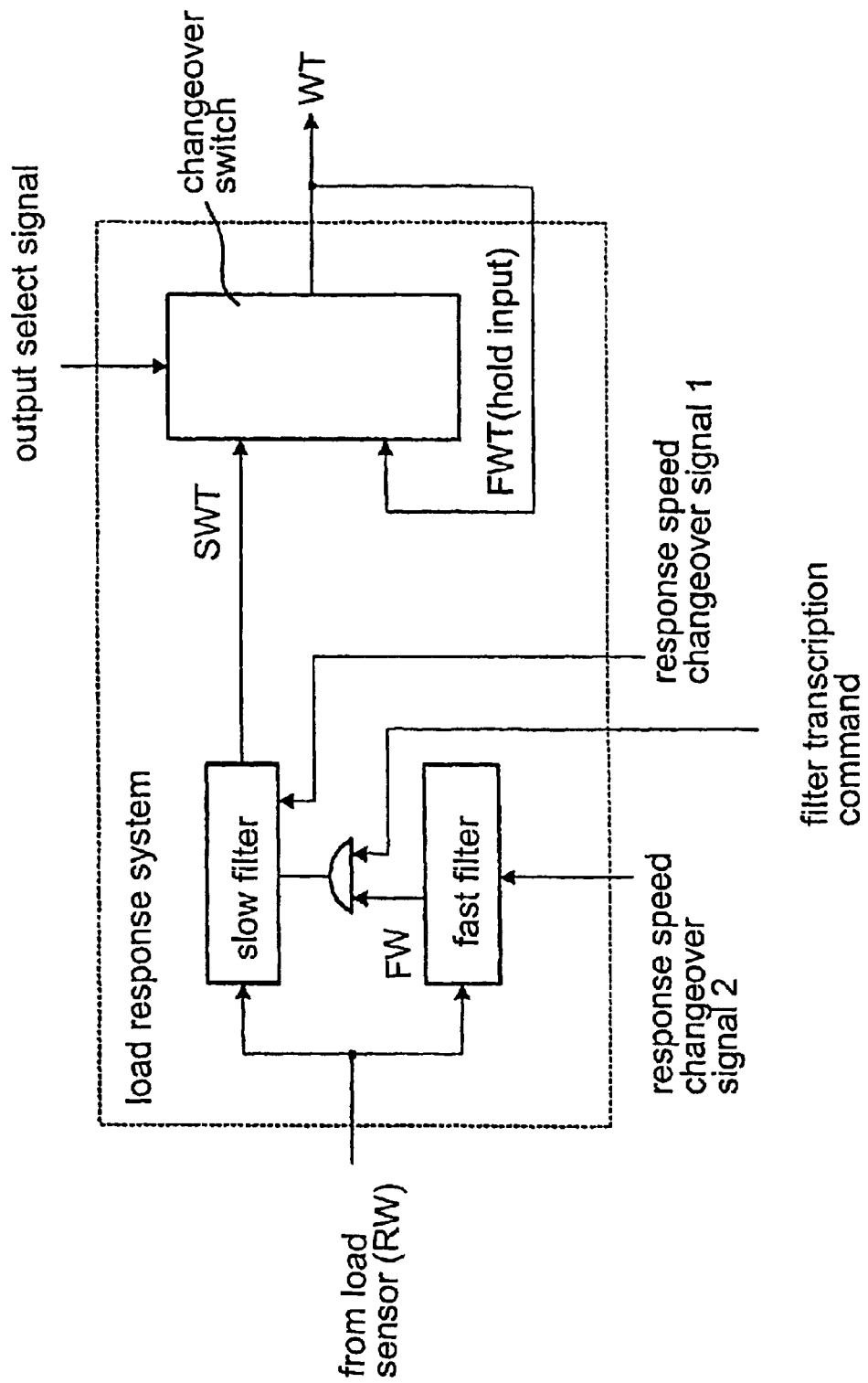

FIG. 2(a) and FIG. 2(b) illustrate the load response system further in detail. In the first example shown in FIG. 2(a), the load response system comprises a fast filter with a fast response characteristic (i.e., a small time constant) and a slow filter with a slow response characteristic (i.e., a large time constant), and switches these two filters with a changeover switch so as to switch a fast response output and a slow response output for the output WT.

Each of the fast filter and the slow filter comprises a digital filter mainly having a register and a computing unit.

Thus, the response speed thereof can be changed by changing coefficients (such as an exponentially smoothed value described later). The response speed of the fast filter is changed by a response speed changeover signal 2, as will be described in detail.

The seventh aspect is provided with a circuit for transcribing a value of each shift register in the fast filter into the corresponding shift register in the slow filter and also with a response speed changeover signal 1 for changing the response speed of the slow filter. When a filter transcription command is initiated, the transcription is performed, namely the value of the each shift register in the fast filter is transcribed to that of the corresponding shift register in the slow filter.

The response speed changeover signal from the response changeover logic in FIG. 1 is used as an output selection signal. According to this signal, the changeover switch selects the outputs from the slow filter and the fast filter, and also works to hold the outputs.

In the second example shown in FIG. 2(b), the output of the fast filter is not used as the measured load output WT, and the response speed of the load is changed by changing the response speed of the slow filter. That is, the raw signal RW from the load sensor is input into the slow filter and is output as the measure load output WT after processed at a predetermined time constant. The response speed (the time constant) of the slow filter is designed to change upon receipt of the response speed changeover signal 1 that is set according to the change in the raw signal from the load sensor. In this case, a part of the response speed changeover signal in FIG. 1 is used as the response speed changeover signal 1 and the rest thereof is used as the output selection signal. The changeover switch determines whether to output the value through slow filter or to hold the value just output previously. Since the other configuration is the same as that of the circuit shown in FIG. 2(a), further description is omitted. As described above, the circuit in FIG. 2(a) is equivalent to that in FIG. 2(b) from the viewpoint of the present invention.

Figure 3:
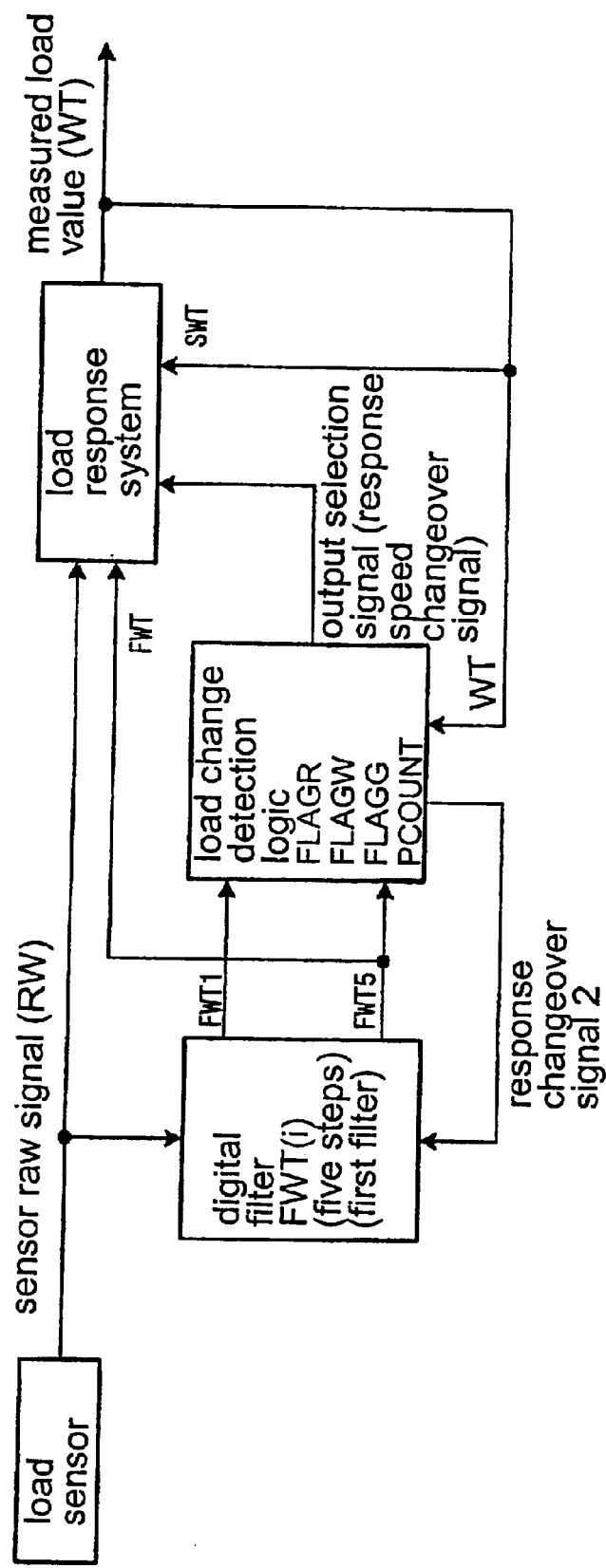
FIG. 3 is a further detailed block diagram in FIG. 1, focusing on response changeover logic.

FIG. 3 illustrates a further detailed example of the block diagram shown in FIG. 1, focusing on the response changeover logic. In this example, the fast filter used for the load response system is also used for the response changeover logic. Thus, the fast filter is shown as FWT(i) outside the load response system in FIG. 3. This filter is a digital filter with five step shift registers, and stores the raw signal RW from the load sensor. The load response system stores FWT5 from the shift-register at the fifth step, which is the final step, as FWT from the fast filter, and also load change detection logic stores FWT1 from the first step shift register and FWT5 from the final step shift register.

Load change detection means stores the measured load WT. Control flags FLAGR, FLAGW, FLAGG, and a value of a counter PCOUNT change according to WT, FWT1, and FWT5. A changeover signal is determined according to a combination of these values and is output into the load response system and the fast filter FWT(i).

Figure 4:
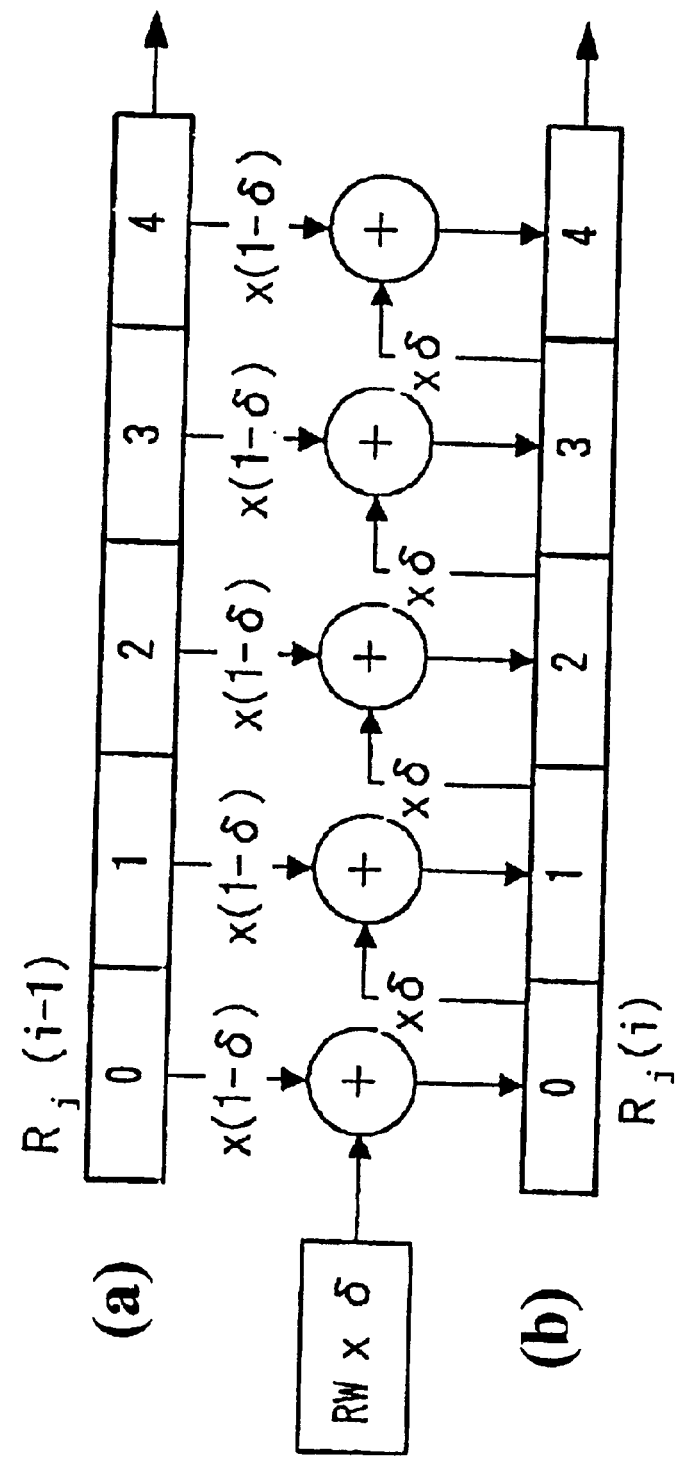
FIG. 4 is an illustration showing a configuration of a fast filter and a slow filter.

An operation of the control block diagram shown in FIG. 3 will be described further in detail. FIG. 4 is an illustration of a configuration of the fast filter and the slow filter for low-pass filtering of the raw signal RW from the load sensor. In this embodiment, the systems including these filters correspond to the fast response system and the slow response system, respectively. A circuit shown in FIG. 4 (which is sometimes configured with software) can be either of the slow filter or the fast filter by changing a response value of a filter described later. The filter for determining a change in an output (RW) from the load sensor also functions as the fast filter. Each filter has five registers. In FIG. 4, (a) shows a state in which a clock signal is not input and (b) shows another state in which the clock signal is input. These registers have exponential smoothing functions and each register is updated by an exponentially smoothed value in the upstream register in accordance with the clock signal.

More particularly, assuming that $R_j(i-1)$ represents a value in the j-th register before an input of the clock signal and $R_j(i)$ represents the value in the j-th register after the input of the clock signal, the following equations are given:

$$R_0(i)=RW\cdot\delta+(1-\delta)\cdot R_0(i-1) \quad (1)$$

$$R_j(i)=R_{j-1}(i)\cdot\delta+(1-\delta)\cdot R_j(i-1) \; (j=1\sim4) \quad (2)$$

where, RW represents the raw output from the load sensor. Also, $R_j(i)$ in each register is transcribed to $R_j(i-1)$ before receiving the next clock signal.

Although the register $R_j(i-1)$ and the register $R_j(i)$ are separately illustrated in FIG. 4 for convenience of explanation, a single register is used in an actual case and the value $R_j(i-1)$ is updated by the calculated value $R_j(i)$. This is a known method in a digital filter with registers.

In this embodiment, clock periods in the fast filter and the slow filter are 0.25 seconds and 1 second, respectively. In the fast filter, two values $\alpha$ (7/16 in the embodiment) and $\beta$ (9/16 in the embodiment) are selectively used as the exponential smoothing factor $\delta$ in accordance with cases described later. In the slow filter, a value $\gamma$ (1/16 in the embodiment), which is smaller than $\alpha$ and $\beta$, is used as $\delta$ in order to make an equivalent time constant larger, and in addition, to make the clock response slower. Values in the fifth registers are designated as the outputs of the fast and slow filters and are represented by FWT and SWT, respectively.

The values $\alpha$ and $\beta$ are selectively used as follows: that is, $\alpha$ is used if the measured load WT obtained at the last measurement exceeds a threshold WS (5 kgf in the embodiment), i.e., if the condition WT>WS is satisfied, and $\beta$ is used if the condition WT≦WS is satisfied. The reason for changing the exponential smoothing weights at such a certain threshold as described above is as follows. When the passenger sits on the unoccupied seat, the time constant is made smaller so that the measured seat load WT quickly follows the actual load. On the other hand, while sitting in the seat, the large time constant is required to prevent such a state from taking place in which if the time constant of the fast filter is too small, FLAGR1 and FLAGR2 change to 1 even if the load change is small, thus making it likely that the measured load WT is held as will be described later.

Flags FLAGR, GLAGW and FLAGG are used to determine the seat load condition on the basis of the outputs of the fast filter and the slow filter. Two auxiliary flags FLAGR1 and FLAGR2, which are not shown in FIG. 3, are used for controlling FLAGR as will be described later.

FLAGR changes to 1 immediately when the load changes, and is determined in the following manner. First, FLAGR1 and FLAGR2 are determined in order to determine FLAGR.

In the following description, i represents a numeric number of the clock timing of the fast filter, i.e., the present state of the fast filter lies in the i-th clock timing beginning from the initial state thereof. Here, the clock timing corresponds to timing for updating a PCOOUNT value.

FLAGR1 is determined as follows. With R1 (0.3 kgf in the embodiment) representing a threshold, the following conditions are given:

$FLAGR1=1$ if $ABS(FWT(i)-FWT(i-1))>R1$ $FLAGR1=0$ if $ABS(FWT(i)-FWT(i-1))\leq R1$ where ABS represents an absolute value. In other words, FLAGR1 changes to 1 if the difference between two absolute values of FWT in the last clock timing and in the present clock timing exceeds a predetermined value. That is, FLAGR1 is a first flag that changes to 1 when a sharp load change is detected in a very short period of time.

FLAGR2 is determined as follows. With R2 (1 kgf in the embodiment) representing another threshold, FLAGR2 changes to 1 if an absolute value of the difference between two values of the first register and the fifth register of the fast filter exceeds R2, and FLAGR2 changes to zero if the absolute value of the difference is equal to or smaller than R2. That is to say, FLAGR2 is another flag that changes to 1 when a relatively large load change takes place over a relatively long period of time.

By designating FLAGR1(i) and FLAGR2(i) as values of FLAGRL and FLAGR2 in the i-th clock timing of the fast filter, respectively, FLAGR is determined in the following manner. If any of FLAGR1(i), FLAGR1(i-1), FLAGR2(i), and FLAGR2(i-1) is zero, FLAGR(i) changes to zero; otherwise, FLAGR(i) changes to 1. In other words, FLAGR=0 means that no output change is detected over the short period of time and the relatively long period of time. FLAGR=1 means that the output change is detected in either of the above time periods.

FLAGW is another flag, which changes from 0 to 1 to 2 when a load change takes place continuously, and is determined as follows. First, as a pre-processing step, a difference ΔW in values of the output FWT of the fast filter and the measured load WT (a value taken as a seat load) in the last clock timing of the fast filter is calculated. If the difference exceeds a threshold, an accumulated value IW of the differences and an accumulated number of times PCOUNT, which indicates the number of times the difference exceeds the above threshold successively, are calculated. That is to say, ΔW(i) is calculated in the following equation:

$$\Delta W(i)=ABS(FWT(i-1)-WT(i-1)) \quad (3)$$

where, FWT(i−1) and WT(i−1) represent FWT and WT in the last clock timing, respectively. With R3 (2 kgf in the embodiment) being the above threshold, when ΔW(i)>R3 is satisfied, the following equations are given:

The above processing provides different cases shown in Table 1, and the value WT to be used as the measured load is determined for each case according to Table 1.

When the passenger sits on the seat, the case changes from Case 1 to Case 7, Case 8, and to Case 2 in that order, and thus, the measured load WT for each of the cases is determined by using the output of the order of FWT, holding SWT or SWT, FWT, and SWT. A process of switching from Case 1 to Case 7 corresponds to those in the foregoing first and fifth aspects. A process of switching from Case 7 to Case 8 corresponds to those in the foregoing second, third, sixth, and seventh aspects. Also, a process of switching from Case 2 to Case 1 in a stable condition after the passenger sits on the seat corresponds to that in the foregoing fourth aspect.

TABLE 1

| Case | FLAGR | FLAGW | FLAGG | last WT | PCOUNT | Value used as a measured load |
|---|---|---|---|---|---|---|
| 1 | 0 | 0 | — | <W | | FWT |
| 2 | 0 | 0 | — | ≧W | | SWT |
| 3 | 0 | 1 | — | — | | Hold last SWT, or SWT |
| 4 | 0 | 2 | — | <W | | FWT |
| 5 | 0 | 2 | — | ≧W | <T | SWT |
| 6 | 0 | 2 | — | ≧W | ≧T | FWT |
| 7 | 1 | — | 0 | | | Hold last SWT, or SWT |
| 8 | 1 | — | 1 | | | FWT |

$$IW(i)=IW(i-1)+((W-R3)) \quad (4)$$

$$PCOUNT(i)=PCOUNT(i-1)+1 \quad (5)$$

If ΔW(i)≦R3 is satisfied, IW and PCOUNT are reset to zero, and each of variables ΔW(0), IW(0), and PCOUNT(0) is also set to zero.

With R4 and R5 (R4<R5, 40 kgf and 240 kgf in the embodiment, respectively) representing respective thresholds, FLAGW is determined by using the above IW in the following manner.

FLAGW=0 when IW<R4
FLAGW=1 when R4≦IW<R5
FLAGW=2 when R5<IW

The initial value of each flag is set to zero. That is, FLAGW changes from 0 to 1 to 2 if a load change continuously exceeds predetermined values for corresponding certain periods of time. FLAGW returns to zero if the load change does not exceed the predetermined values. PCOUNT indicates a period of time in which the load change exceeding the predetermined value continues.

FLAGG is a flag for determining whether the passenger gets in or out of the car, and is determined as follows. Where RW is the raw output from the load sensor, WT is the measured load taken as the seat load, and R6, R7, and R8 (respectively, 25 kgf, 5 kgf, and 10 in the embodiment) respectively represent a threshold of a change in the seat load, a threshold of the seat load, and a threshold of a time period of the change in the seat load while the passenger is boarding, if all the following conditions (6) to (8) are satisfied, FLAGG is set to 1, otherwise, FLAGG is set to zero.

$$(RW(i)-WT(i-1))\geqq R6 \quad (6)$$

$$WT(i-1)\leqq R7 \quad (7)$$

$$PCOUNT(i)\geqq R8 \quad (8)$$

W is a threshold for switching FWT and SWT, and is set to 10 kgf in the embodiment. T is a threshold of the accumulated number of times PCOUNT, and is set to 16 in the embodiment. Because the clock period of PCOUNT is 0.25 seconds as described above, T=16 corresponds to 4 seconds.

Case 1 is a state of the small load change and also a small load; for example, representing a state in which the seat is not occupied or the passenger just got in the car. In this state, the output of the fast filter is used as the measured load WT in order to quickly detect the passenger on board.

When the passenger sits on the seat, the raw output RW from the load sensor rapidly increases, causing FLAGR2 and accordingly FLAGR to change to 1 immediately. With respect to determining FLAGG, FLAGG is zero for at least 2.5 seconds since the condition (8) is not satisfied for that period of time, though the conditions (6) and (7) are satisfied. In reality, the condition (8) is satisfied after about 3 seconds because the condition ΔW(i)>R3 is satisfied a little while after the passenger sits on the seat. Consequently, the measured load WT obtained before the passenger seating is used as the measured load WT because Case 7 is applied until the condition (8) is satisfied. Since the condition ΔW(i)>R3 is satisfied a little while after the passenger seating, PCOUNT is counted up and the condition (8) is satisfied after about 3 seconds. This leads to Case 8 and thus the output of the fast filter is used as the measured weight WT.

With the above logic, if the passenger seating situation continues for more than about 3 seconds, the initial output of the fast filter is used as the measured weight WT. In other situations like when the passenger temporarily sits on the seat or pushes the seat with a hand within a time period of about 3 seconds, the measured value obtained while the seat is unoccupied is held as the measured load WT.

In Case 8, when the output of the fast filter is used as the measured load WT, IW and PCOUNT are reset because the condition ΔW(i)≦R3 is satisfied. In addition, FLAGW and FLAGG change to Zero because the condition (6) becomes no longer valid. When the change in the output of the fast filter becomes insignificant in this state, FLAGR changes to zero. Thus, since the measured load WT is equal to or more than W, Case 2 is applied and subsequently the output of the slow filter is used as the measured load WT. That is, after about 3 seconds from detection of the seated passenger, the output of the slow filter increases in a stepped manner so as to come close to the actual value, and after that, the output of the filter with the large time constant is used as the measured load WT.

Accordingly, the following three conditions are met at the same time: that is, being unresponsive to the temporary load increase, detecting the load of the seated passenger immediately after the predetermined time period (about 3 seconds), and being unresponsive to noise such as an acceleration of the car and the motion of the passenger on board.

At the stage in which the output of the fast filter is used as the measured load WT, if it is designed that values in all registers of the slow filter are replaced with this measured load WT, the measured value that is closer to the actual load can be obtained when the output of the slow filter is used as the measured load WT. The above replacement of the values in the registers of the slow filter to the measured load WT may be performed after a predetermined time period from the stage in which the output of the fast filter is used as the measured load WT, or at the stage of Case 2 in which the output of the slow filter is used as the measured load WT. This corresponds to the third aspect.

When the load increases temporarily, as the condition ΔW(i)≦R3 is satisfied at the end of the increase, IW and PCOUNT are reset, and also FLAGG and FLAGW change to zero. After FLAGR changes to zero, the measured load WT is smaller than W, thus, Case 1 is applied, and the output of the fast filter is used as the measured load WT.

When the passenger gets out of the car, the case usually changes from Case 2 to Case 7, Case 3, Case 5, Case 6, 5 and to Case 1 in that order, and thus, the measured load WT for each of the cases is determined by the output of the order of SWT, holding SWT, SWT, and FWT. A process of switching from Case 2 to Case 7 corresponds to the foregoing first and fifth aspects, and the process of switching from Case 5 to Case 6 corresponds to the foregoing second, third, sixth, and seventh aspects.

When the passenger gets out of the car, the raw output RW from the load sensor decreases sharply, allowing FLAGR2 to change to 1 immediately, and FLAGR to thereby change to 1 immediately. With respect to determining FLAGG, FLAGG is zero since condition (8) is not satisfied for about 3 seconds, though condition (6) is satisfied. Even after the above period of time, i.e., about 3 seconds, equation (7) is still not satisfied and FLAGG still remains zero since the measured value obtained before getting out of the car is held as the measured load WT, accordingly Case 7 is applied and the measured value obtained before getting out of the car is kept in use as the measured load WT.

Since the condition ΔW(i)>R3 is satisfied at this stage, IW is added up and PCOUNT is counted up, and the condition R4≦IW<R5 is satisfied, thus allowing FLAGW to change to 1. On the other hand, when FLAGW changes to 1, the change in the output of the fast filter becomes insignificant, and FLAGR1 and FLAGR2 change to zero, thus allowing FLAGR to change to zero. As a result, Case 3 is applied and the measured value obtained before getting out of the car is kept in use as the measured load WT.

If IW is added up further and the condition R5<IW is met, FLAGW changes to 2. In this stage, if PCOUNT is smaller than T (=16), Case 5 is applied and the output of the slow filter is used as the measured load WT. If PCOUNT is equal to or larger than T, i.e., when 4 seconds have passed after the passenger had got out of the car, Case 6 is applied and the output of the fast filter is used as the measured load WT.

When Case 6 is applied and the output of the fast filter is used as the measured load WT, the condition ΔW(i)≦R3 is satisfied, allowing IW and PCOUNT to be reset, and also FLAGG and FLAGW to change to zero. In this stage, the measured load WT is smaller than W, thus Case 1 is applied, and then the output of the fast filter is used as the measured load WT.

With this logic, only when the state in which the passenger is out of the car continues for more than 4 seconds, the measurement is performed through the fast filter, and the measured value obtained by this measurement is used as the measured load WT. In other words, when the passenger temporarily gets out of the car for 4 seconds or less, the measured value obtained while the passenger was just previously sitting on the seat is used as the measured load WT, and the seat load is measured through the slow filter for this time period, i.e., for 4 seconds. On the other hand, when the state in which the passenger is out of the car continues for more than 4 seconds, the measurement is switched from the slow filter to the fast filter, and the output of the fast filter is used as the measured load WT.

Accordingly, the following conditions are satisfied: that is, when the passenger gets in the car, the measured load WT is updated in the short period of time, e.g., in about 3 seconds, and when the passenger gets out of the car, the measured load WT is not updated in the long period of time, e.g., in 4 seconds, that is to say, the previous state is held.

When the state in which the passenger is out of the car continues for the short period of time, for example, when the passenger sits on the seat again in the state of Case 7, the condition ΔW(i)≦R3 is satisfied at that time, allowing IW and PCOUNT to be reset, and also FLAGW together with FLAGG to change to zero. Accordingly, the state of Case 7 continues for a while, and then Case 2 is applied again because the measured load WT is equal to or more than W when a change in the output of the fast filter becomes insignificant and FLAGR changes to zero.

An operation of the measuring device, in a state in which the raw output RW from the load sensor of the seat load changes temporarily caused by, for example, opening and closing a door by the passenger, trying to pick something up by the passenger, a large vibratory motion of the car, will be described. A certain degree of load changes or a larger load changes while the passenger sitting on the seat allows FLAGR1 or FLAGR2 to change to 1, and accordingly, FLAGR to change to 1. In this stage, Case 7 is applied since FLAGG is zero, and the previously measured load WT is held. Thus, the measuring device is not responsive to such a load change. When the load change takes place in an extremely short period and in addition, Case 7 is applied while FLAGW and FLAGG remain zero, FLAGR1 and FLAGR2 also remain zero, and thus allowing FLAGR to be unresponsive and remain zero. Accordingly, Case 2 is applied again since the measured load WT is equal to or more than W.

The load change for a little longer period allows FLAGW to change to 1. In addition, if the change remains insignificant, FLAGR1 and FLAGR2 change to zero, allowing FLAGR to change to zero. Accordingly, Case 3 is applied and the previously measured load WT is held so that the measuring device remains unresponsive to such a load change.

When the load change is removed in this stage, FLAGR changes to 1 again, and Case 7 is applied again since FLAGG is zero, thus allowing the previously measured load WT to be held. When a change in the output of the fast filter becomes insignificant and FLAGR changes to zero in the meantime, Case 3 is applied again and the previously measured load WT remains in the held state. However, as soon as the condition $\Delta W(i)<R3$ becomes satisfactory in this stage, FLAGW changes to zero and Case 2 in which measurement is performed in the normal sitting state is applied again.

When a load change continues for a longer time, FLGAW changes to 2 while FLAGR remains zero. Thus, if the time period from the load change is shorter than 4 seconds, the output of the slow filter is used as the measured load WT. If the above time period is equal to or longer than 4 seconds, the output of the fast filter is used as the measured load WT. This is based on a concept such that, when the change in the raw output RW from the load sensor continues for a certain period of time, the newly measured load WT is used even when the load change actually occurs.

When the output of the fast filer is used as the measured load WT, the condition $\Delta W(i) \leq R3$ is satisfied in the course of time, allowing FLAGW to change to zero, and thus Case 2 in which measurement is performed in a normal sitting state is applied again.

According to this embodiment as stated above, the seat-load measuring device is unresponsive to the load change in the short period of time by holding a previously measured value, and when the significant load change continues for a certain period of time, the device uses the load as the measured load WT.

In this embodiment, although each flag is controlled in the load change detection logic according to the measured load WT and the values of FWT1 and FWT5 as shown in FIG. 3, the raw signal from the load sensor may be input directly into the load change detection logic. However, one skilled in the art will appreciate that it is rather difficult to reliably determine the measured load WT when the raw signal output from the load sensor contains noise.

Although the digital filter is used for each of the slow filter and the fast filter in all the embodiments, an analog filter may be used for at least one of them, and also software may be used instead as described above. When the analog filter is used, it is necessary to change a filter characteristic thereof by changing electrical constants of a part constituting the filter.

As described above, the measuring device according to the present invention allows the measured load to quickly follow the load change when the passenger gets in or out of the car, while avoiding the situation in which an irrelevant load change of not actually getting in or out of the car is taken into the measure load.

While the invention has been explained with reference to the specific embodiments of the invention, the explanation is illustrative and the invention is limited only by the appended claims.

What is claimed is:

1. A seat-load measuring device for measuring a weight of a passenger and an object sitting on a car seat, comprising:
    a load sensor disposed under the seat for electrically sending load data,
    a first data processing unit electrically connected to the load sensor and having a predetermined response time,
    a second data processing unit electrically connected to the load sensor and having a slower response time than that of the first data processing unit,
    detecting means electrically connected the load sensor, and the first and the second data processing unit for detecting a change in the load data, and
    switching means electrically connected to the detecting means, and the first and the second data processing unit for switching between the first and the second data processing unit to process the load data from the load sensor.

2. A seat-load measuring device according to claim 1, wherein said switching means switches to the first processing unit from the second processing unit after a first predetermined period of time when the detecting means detects that the change in the load data exceeds a first predetermined value.

3. A seat-load measuring device according to claim 1, wherein said first data processing unit is a first filter having a predetermined time constant, said second data processing unit is a second filter having a slower time constant than that of the first filter, and said switching means switches to the first processing unit from the second processing unit at a timing determined by a difference between outputs of the first filter and the second filter.

4. A seat-load measuring device according to claim 2, wherein said second data processing unit includes a digital filter having a variable filter value to change a response time of the digital filter, and said switching device changes the variable filter value such that the difference between outputs of the first filter and the second filter becomes smaller when the switching means switches to the first processing unit from the second processing unit.

5. A seat-load measuring device according to claim 1, wherein said switching means switches to the second processing unit from the first processing unit when the detecting means detects the load data exceeds a predetermined load.

6. A seat-load measuring device for measuring a weight of a passenger and an object sitting on a car seat, comprising:
    a load sensor disposed under the seat for electrically sending load data,
    detecting means electrically connected to the load sensor for detecting a change in the load data, and
    data holding means electrically connected to the load sensor and the detecting means for holding the load data for a first predetermined period of time and outputting the held load data when the detecting means detects that the change in the load data exceeds a first predetermined value, said first predetermined period of time being adjusted based on the change in the load data.

7. A seat-load measuring device according to claim 6, further comprising a plurality of filters having different time constants, said first predetermined period of time being adjusted based on a difference between outputs of at least two of the filters.

8. A seat-load measuring device according to claim 7, further comprising switching means, said filters being digital filters having different time constants, said switching means switching to one of the digital filters having a larger time constant than those of the other after the first predetermined time period.

9. A seat-load measuring device according to claim 7, wherein one of said filters is an analog filter whose time constant can be changed by changing an electrical constant of a part constituting said analog filter.

10. A seat-load measuring device according to claim 6, further comprising software for processing the load data with slow and fast response times, said first predetermined period of time being adjusted based on a difference between the load data processed with the slow response time and with the fast response time.

* * * * *